(12) United States Patent
Holtz

(10) Patent No.: US 8,074,213 B1
(45) Date of Patent: Dec. 6, 2011

(54) AUTOMATIC SOFTWARE UPDATES FOR COMPUTER SYSTEMS IN AN ENTERPRISE ENVIRONMENT

(75) Inventor: Kevin Holtz, Watkins, MN (US)

(73) Assignee: Symantec Operating Corporation, Mountain View, CA (US)

( * ) Notice: Subject to any disclaimer, the term of this patent is extended or adjusted under 35 U.S.C. 154(b) by 1487 days.

(21) Appl. No.: 11/502,681

(22) Filed: Aug. 11, 2006

(51) Int. Cl.
*G06F 9/445* (2006.01)

(52) U.S. Cl. ........................................................ 717/172

(58) Field of Classification Search ........................ None
See application file for complete search history.

(56) References Cited

U.S. PATENT DOCUMENTS

| | | | |
|---|---|---|---|
| 5,155,847 A | 10/1992 | Kirouac et al. | |
| 5,421,009 A | 5/1995 | Platt | |
| 5,473,772 A | 12/1995 | Halliwell et al. | |
| 5,493,682 A | 2/1996 | Tyra et al. | |
| 5,555,416 A | 9/1996 | Owens et al. | |
| 5,790,796 A | 8/1998 | Sadowsky | |
| 6,009,274 A * | 12/1999 | Fletcher et al. | 717/173 |
| 6,123,737 A | 9/2000 | Sadowsky | |
| 6,151,708 A * | 11/2000 | Pedrizetti et al. | 717/173 |
| 6,614,804 B1 * | 9/2003 | McFadden et al. | 370/468 |
| 6,704,885 B1 * | 3/2004 | Salas-Meza et al. | 714/6.3 |
| 6,779,176 B1 * | 8/2004 | Chambers et al. | 717/169 |
| 6,990,660 B2 * | 1/2006 | Moshir et al. | 717/171 |
| 7,080,372 B1 * | 7/2006 | Cole | 717/173 |
| 7,478,381 B2 * | 1/2009 | Roberts et al. | 717/168 |
| 7,584,467 B2 * | 9/2009 | Wickham et al. | 717/171 |
| 7,676,804 B2 * | 3/2010 | Ferguson et al. | 717/173 |
| 7,770,003 B2 * | 8/2010 | Herbert et al. | 713/160 |
| 2004/0031029 A1 * | 2/2004 | Lee et al. | 717/171 |
| 2004/0117414 A1 * | 6/2004 | Braun et al. | 707/204 |
| 2006/0010437 A1 * | 1/2006 | Marolia | 717/168 |
| 2007/0043831 A1 * | 2/2007 | Kessler et al. | 709/219 |
| 2008/0098160 A1 * | 4/2008 | Slyz et al. | 711/103 |

OTHER PUBLICATIONS

Microsoft Corporation, "How to configure and use Automatic Updates in Windows XP", Microsoft, Inc., downloaded from http://support.microsoft.com/kb/306525, Dec. 5, 2007, 4 pages.

* cited by examiner

*Primary Examiner* — Lewis Bullock, Jr.
*Assistant Examiner* — Jue Wang
(74) *Attorney, Agent, or Firm* — Meyertons, Hood, Kivlin, Kowert & Goetzel, P.C.

(57) ABSTRACT

A system and method for automatically updating a software application deployed on a plurality of client computers are disclosed. A server computer may determine a time for the client computers to update the software application and send an update command to each of the client computers at the determined time. In response to the update command, each client computer may download an update for the software application and install the update for the software application.

13 Claims, 5 Drawing Sheets

AUTOMATIC SOFTWARE UPDATES FOR COMPUTER SYSTEMS IN AN ENTERPRISE ENVIRONMENT

BACKGROUND OF THE INVENTION

1. Field of the Invention

This invention relates to automatic software updates. More particularly, the invention relates to a system and method for automatically updating a software application deployed on a plurality of computers in an enterprise environment.

2. Description of the Related Art

Large enterprises often have many computer systems on which a software application is deployed. Software applications often need to be updated as new versions or bug fixes are released. Updating a software application on many computers in an enterprise is a significant challenge. If the software application is updated manually then the administrative process of individually updating each computer in the enterprise can take days or even weeks. In addition to the time and expense involved, there is also a potential problem caused by different computers running different versions of the software application. It may be necessary to synchronize the software updates across different computers in a manner that keeps the software versions in sync with each other.

One example of a type of software application that often needs to be updated across different computers in an enterprise is Enterprise Data Management (EDM) software. EDM software performs various operations related to data management in an enterprise environment, such as data backups and data storage. Since data management is a critical function, it may be necessary to update EDM software across computers in the enterprise in a manner that does not interfere with the data management.

SUMMARY

Various embodiments of a system and method for automatically updating a software application deployed on a plurality of client computers are disclosed. According to one embodiment of the method, a server computer may send an update command to each of the client computers. In response to the update command, each client computer may download an update for the software application and install the update for the software application.

Further embodiments of the method comprise the server computer determining a time for the client computers to update the software application. The server computer may send the update command to the client computers at the determined time. Various examples of criteria for determining the update time are disclosed.

BRIEF DESCRIPTION OF THE DRAWINGS

A better understanding of the invention can be obtained when the following detailed description is considered in conjunction with the following drawings, in which.

Figure 1:
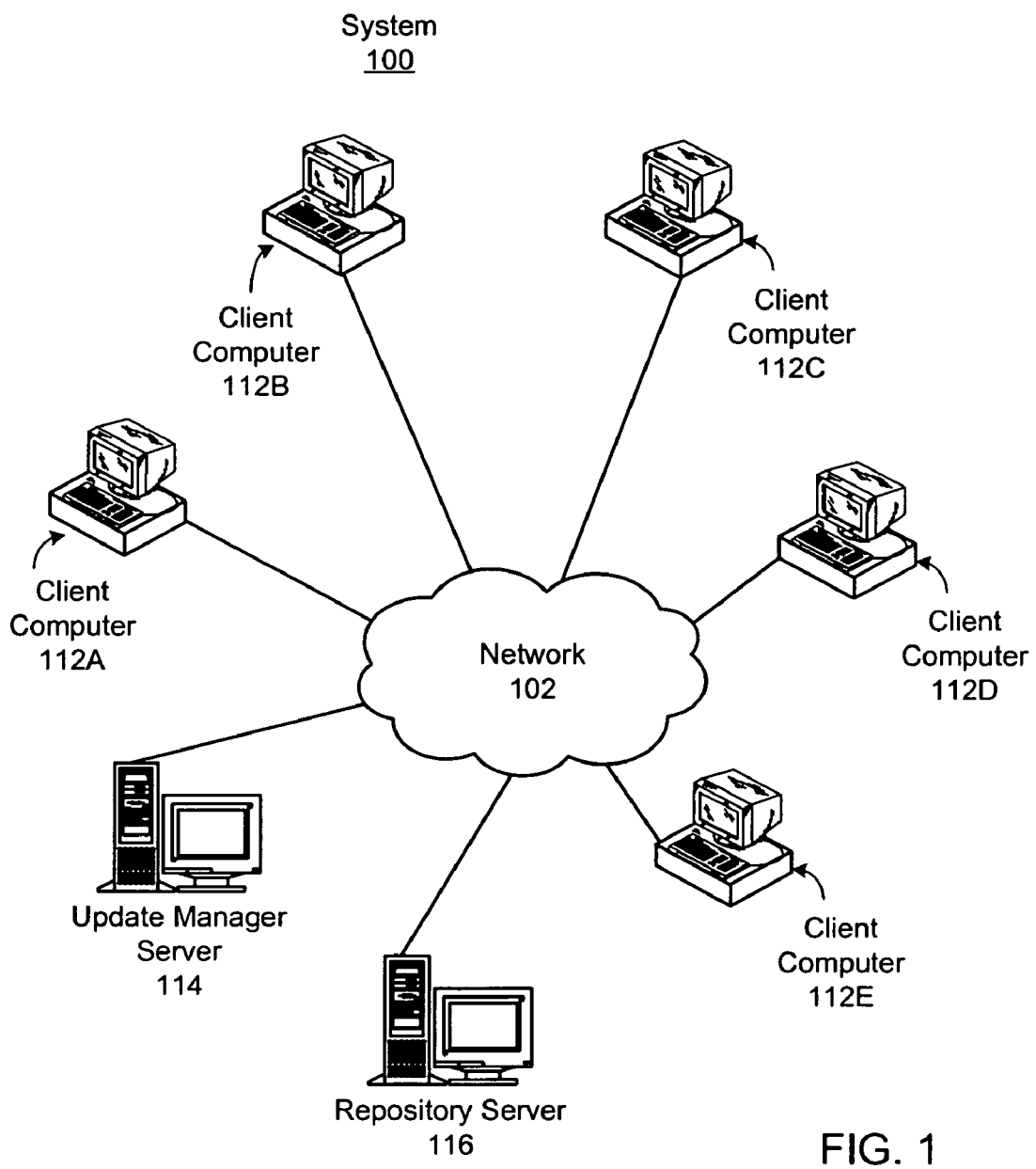
FIG. 1 illustrates a system including a plurality of client computers on which a software application to be automatically updated is deployed.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for automatically updating a software application deployed on a plurality of computers are described herein. Each computer on which the software application is deployed is referred to herein as a client computer. For example, FIG. 1 illustrates a system 100 that includes a plurality of client computers 112. In this example, the system 100 includes client computers 112A-112E, although in various embodiments any number of client computers may be present. It is noted that throughout this disclosure, drawing features identified by the same reference number followed by a letter (e.g., client computers 112A-112E) may be collectively referred to by that reference number alone (e.g., client computers 112) where appropriate.

In the illustrated embodiment, the client computers 112 are coupled to an update manager server 114 and a repository server 116 via a network 102. The repository server 116 stores updates for the software application, i.e., stores program instructions and/or data for updating the software application deployed on each of the client computers 112. As described in detail below, the update manager server 114 may communicate with the client computers 112 to control them to connect to the repository server 116 to download and install the updates.

In various embodiments, the network 102 may include any type of network or combination of networks. For example, the network 102 may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, the various computers in the system 100 may each be coupled to the network 102 using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

In various embodiments the update manager server 114 may manage automatic updates for any of various kinds of software applications deployed on the client computers 112. As one example, the update manager server 114 may manage automatic updates of Enterprise Data Management (EDM) software deployed across the client computers 112. The EDM software may perform various operations related to data management in the system 100, such as data backups and data storage.

Figure 2:
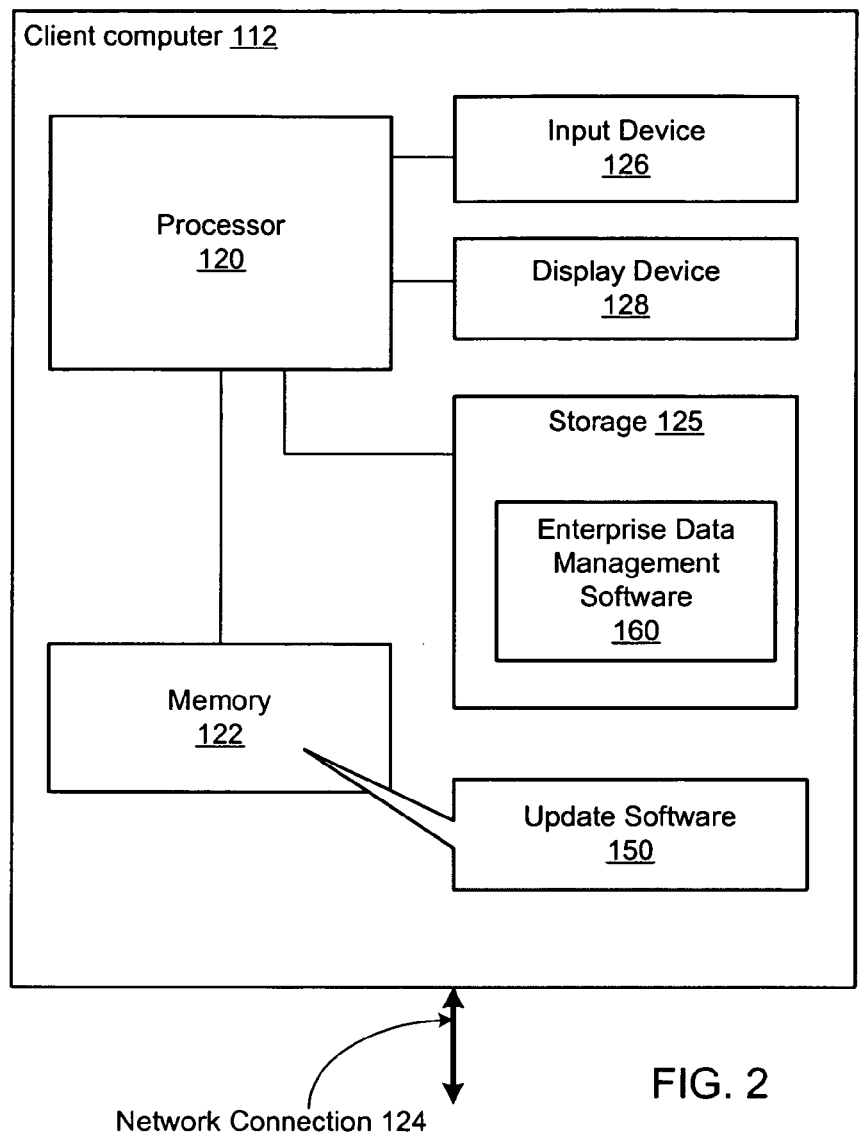
FIG. 2 illustrates an exemplary one of the client computers.

FIG. 2 illustrates an exemplary one of the client computers 112. The client computer 112 includes storage 125, e.g., one or more storage devices configured to store program instructions and/or data. In particular, the storage 125 may store a software application (e.g., program instructions and associated data) for which automatic updates are performed as described herein. In the example of FIG. 2, the software application to be automatically updated comprises EDM software 160, although in other embodiments the methods described herein may be used to automatically update various other types of software applications.

In various embodiments the storage 125 may include any of various kinds of storage devices. For example, the storage devices may include storage devices operable to store data in a stable or non-volatile manner, such as optical storage devices or storage devices that utilize magnetic media, e.g., one or more hard drives or tape drives. In one embodiment, the storage 125 may be implemented as one or more hard disks configured independently or as a disk storage system. In one embodiment, the disk storage system may be an example of a redundant array of inexpensive disks (RAID) system. In another embodiment, the disk storage system may be a disk array, or Just a Bunch Of Disks (JBOD), (used to refer to disks that are not configured according to RAID). In yet other embodiments, the storage 125 may include RAM disks, for example.

The client computer 112 also includes a processor 120 coupled to a memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition. The memory 122 may be configured to store program instructions and/or data. In particular, the memory 122 may store update software 150.

The processor 120 may be configured to execute program instructions and to operate on data stored within the memory 122. In particular, the processor 120 may execute the update software 150. As described in detail below, the update software 150 may execute to connect to the repository server 116 to download updates for the EDM software 160 in response to receiving an update command from the update manager server 114.

It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the client computer 112 may include multiple processors 120.

The client computer 112 also includes one or more input devices 126 for receiving user input from a user of the client computer 112. The input device(s) 126 may include any of various types of input devices, such as keyboards, keypads, microphones, or pointing devices (e.g., a mouse or trackball).

The client computer 112 also includes one or more output devices 128 for displaying output to the user. The output device(s) 128 may include any of various types of output devices, such as LCD screens or monitors, CRT monitors, etc.

The client computer 112 may also include a network connection 124 through which the client computer 112 couples to the network 102. The network connection 124 may include any type of hardware for coupling the client computer 112 to the network 102, e.g., to enable communication over the network 102 in a wired or wireless manner.

In various embodiments the client computer 112 illustrated in FIG. 2 may execute any of various kinds of operating systems. It is noted that in some embodiments the system 100 may include heterogeneous types of client computers 112. For example, one or more of the client computers 112 may execute one operating system, e.g., a Microsoft Windows operating system, and a second one or more of the client computers 112 may execute a different operating system, e.g., a Unix operating system. The method described herein may be utilized to perform automatic software updates on heterogeneous types of client computers 112 in a platform-independent manner.

Figure 3:
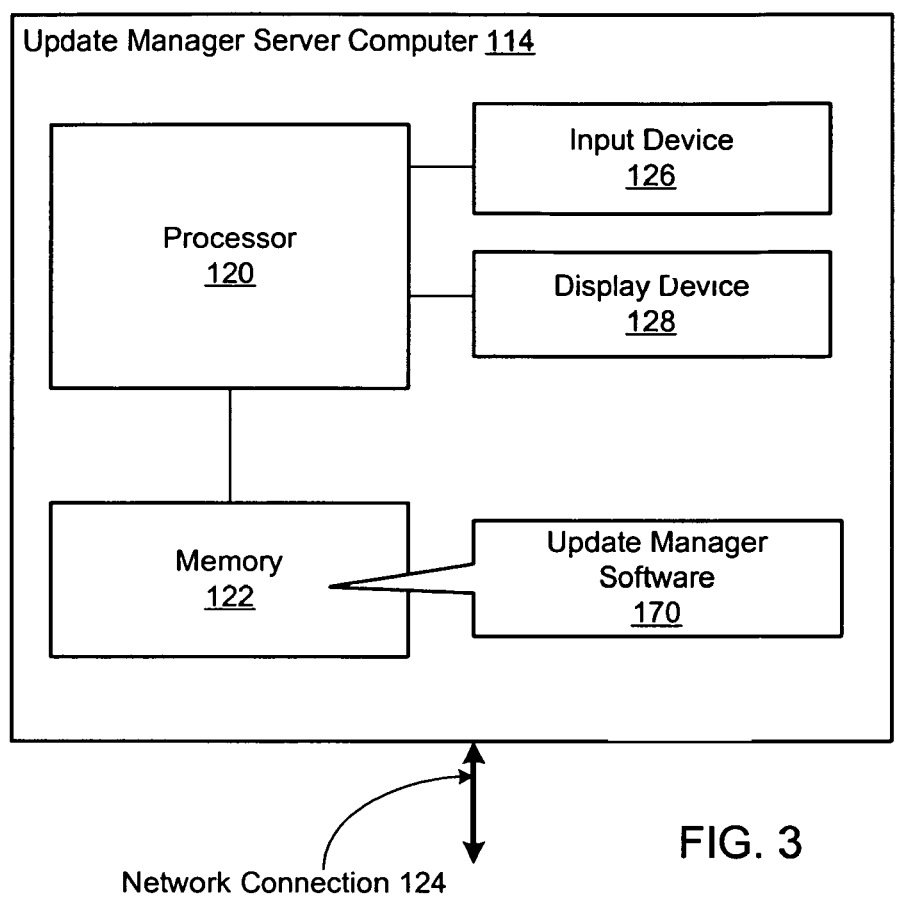
FIG. 3 illustrates an exemplary update manager server operable to manage the automatic updates for the client computers.

Referring now to FIG. 3, an exemplary embodiment of the update manager server 114 is illustrated. The update manager server 114 includes a processor 120 coupled to a memory 122, similarly as described above with reference to FIG. 2. In this case, the memory 122 stores update manager software 170. The processor 120 of the update manager server 114 may execute the update manager software 170 to manage updates of the EDM software 160 (or other application software) deployed on the client computers 112, as described below.

The update manager server 114 also includes one or more input devices 126 for receiving user input from a user of the update manager server 114. The input device(s) 126 may include any of various types of input devices, such as keyboards, keypads, microphones, or pointing devices (e.g., a mouse or trackball).

The update manager server 114 also includes one or more output devices 128 for displaying output to the user. The output device(s) 128 may include any of various types of output devices, such as LCD screens or monitors, CRT monitors, etc.

Figure 4:
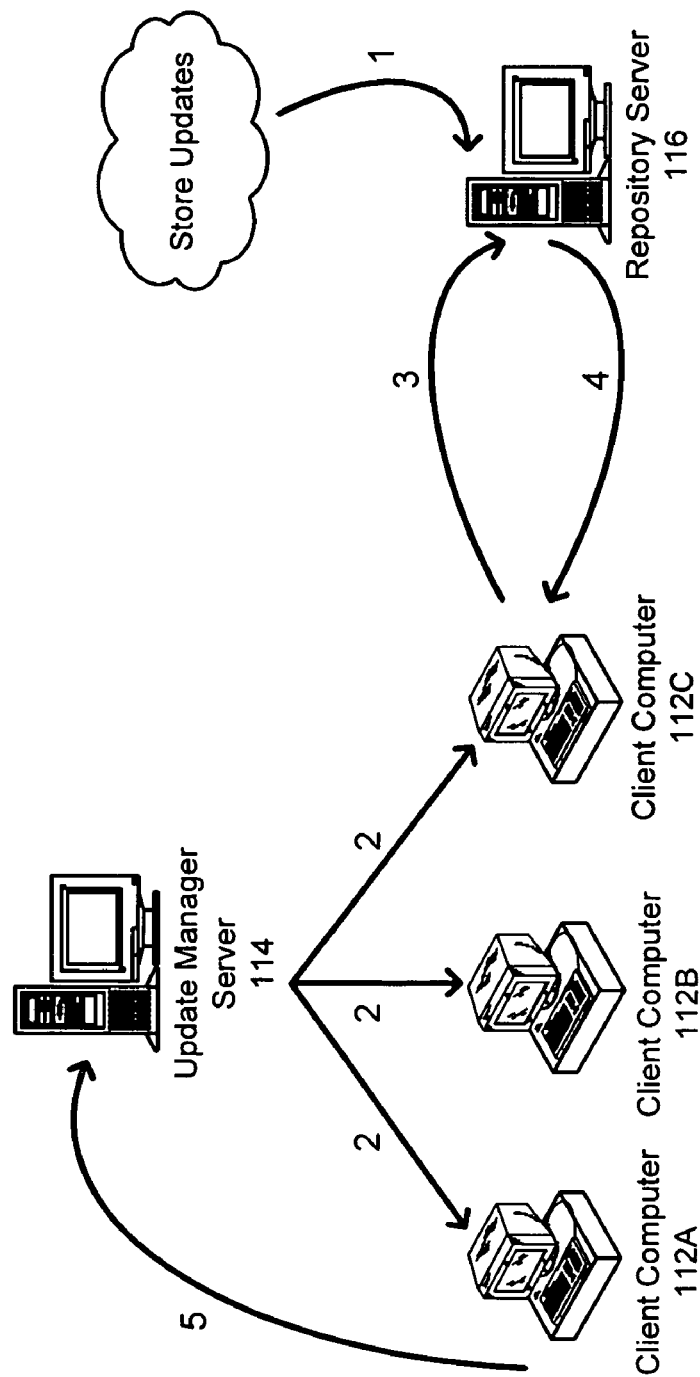
FIG. 4 is a flow diagram illustrating one embodiment of a method for performing automatic software updates of the software application deployed on the client computers.

FIG. 4 is a flow diagram illustrating one embodiment of a method for performing automatic software updates of the EDM software 160 (or other application software) deployed on the client computers 112 in the system 100.

As indicated by arrow 1, a software update package to be deployed on the client computers 112 may be stored on the repository server 116. The software update package stored on the repository server 116 may comprise program instructions and/or data for updating the EDM software 160 deployed on each of the client computers 112. In one embodiment the software update package may be stored on the repository server 116 by downloading it from another server, e.g., via the Internet. For example, a vendor of the EDM software 160 may make the software update package available for download on an FTP server or web server. In other embodiments the software update package may be stored on the repository server 116 in various other ways, e.g., by copying it from a memory medium such as a CD-ROM.

The update manager server 114 may initiate an update process on each of the client computers 112 by sending them an update command, as indicated by the arrows 2. More particularly, the update manager software 170 may execute on the update manager server 114 to send each of the client computers 112 the update command.

In response to the update command, the update software 150 on each of the client computers executes to communicate with the repository computer 116 to determine whether a software update for the EDM software 160 is available, as indicated by arrow 3. For example, each client computer 112 may store a version number or other information indicating which version or patch level of the EDM software 160 is currently deployed on the client computer 112. The software update package stored on the repository server 116 may have version information that can be compared to the version information on the client computer 112 to determine whether the EDM software 160 needs to be updated. Each client computer that needs to be updated may then download the software update package from the repository server 116, as indicated by arrow 4.

After downloading the software update package, the client computers 112 may then apply the update to the EDM software 160. For example, the software update package may include one or more executable program files that the client computers 112 execute to update the EDM software 160, or the update software 150 on each client computer 112 may be operable to update the EDM software 160 based on information in the software update package.

As indicated by arrow 5, each client computer 112 may return status information regarding the update process to the update manager server 114. For example, if a client computer 112 successfully downloads and installs an update for the EDM software 160 then the client computer 112 may return information indicating the successful update to the update manager server 114. As another example, if a client computer 112 is unable to connect to the repository server 116 or is unable to successfully download or install the software update package then the client computer 112 may return information indicating the error condition to the update manager server 114. As another example, if a client computer 112 determines that no new updates are available on the repository server 116 then the client computer 112 may return information to the update manager server 114 indicating the EDM software 160 on the client computer 112 was already up to date.

The update manager server 114 preferably sends the update command to the client computers 112 in such a way that each client computer 112 receives the update command substantially simultaneously (e.g., within a few seconds of each other). Thus, each client computer 112 may check for and install updates for the EDM software 160 at roughly the same time. This may ensure that the versions of the EDM software 160 deployed on the various client computers 112 remain synchronized with each other. The coordination of the EDM software updates by the update manager server 114 may thus offer advantages over techniques in which the client computers 112 operate independently of each other to update the EDM software 160.

Figure 5:
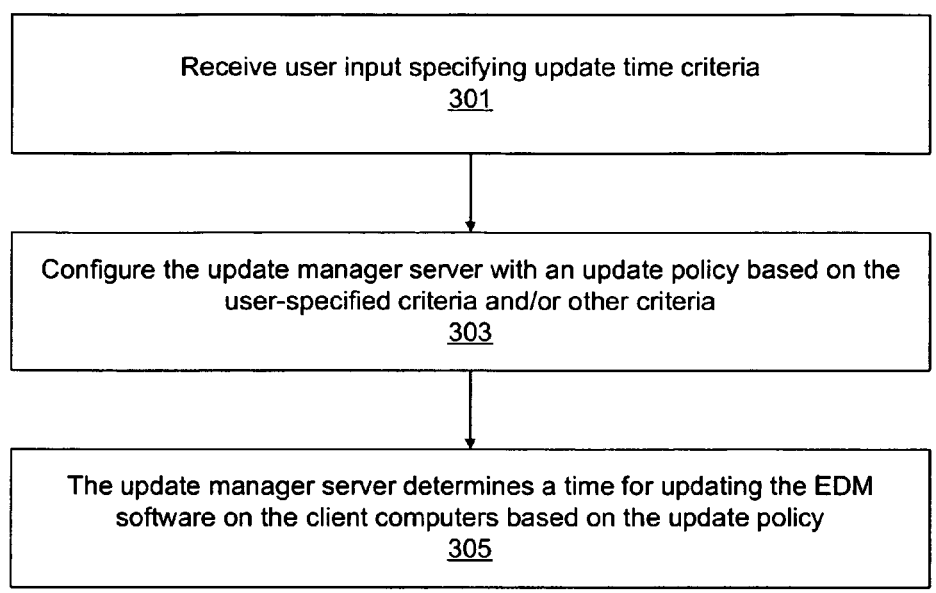
FIG. 5 is a flowchart diagram illustrating one embodiment of a method for determining a time for the software updates on the client computers to be performed.

In various embodiments the update manager server 114 may be operable to initiate the update process on the client computers 112 at various times or in response to various conditions. FIG. 5 is a flowchart diagram illustrating one embodiment of a method for determining a time for the client computers 112 to update the EDM software 160.

As indicated in 301, user input specifying update time criteria may be received. For example, the update manager software 170 may execute on the update manager server 114 to display a graphical user interface that allows the user to specify various kinds of criteria for when to initiate the update process on the client computers 112.

As indicated in 303, the update manager server 114 may be configured with an update policy based on the user-specified criteria received in 301 and/or other criteria. The update policy may represent an algorithm or heuristic for determining when the update process should be initiated to update the EDM software 160 on the client computers 112. In 305, the update manager server 114 may determine a time for initiating the updates of the EDM software 160 on the client computers 112 based on the update policy and may send the update command to the client computers 112, as described above.

In various embodiments the update policy may be based on any of various kinds of update time criteria, e.g., where the criteria can be specified by the user in 301 and/or where the update time criteria are hard-coded into the update manager software 170. In a typical embodiment, the update policy may be designed to initiate the software updates at a time when interference with other operations performed by the client computers 112 can be avoided or minimized.

As one example, an administrator (e.g., user of the update manager server 114) may specify a date, a time, and/or a time window for when to initiate the updates. For example, the administrator may specify that the updates should only be initiated between the hours of 2:00 am and 4:00 am, e.g., when the system 100 or the client computers 112 are typically least busy.

As another example, the user may specify a number of update processes that are allowed to run simultaneously. For example, the update manager server 114 may be operable to update multiple software applications on the client computers 112, or different components of the EDM software 160 may be updated using separate update processes. Thus, the number of update processes that can be performed simultaneously may be limited to a maximum number to avoid overloading the system 100 with software update activity.

In other embodiments the update policy employed by the update manager server 114 may utilize any of various other kinds of resource management techniques to determine when to initiate the software updates on the client computers 112. For example, the update manager server 114 may be operable to monitor activity of the EDM software 160 executing on the client computers 112 and may only initiate the software updates when the EDM software 160 is not busy performing other functions. As one example, the update manager server 114 may only initiate the software updates if the EDM software 160 is not currently performing a data backup operation on any of the client computers 112.

As another example of resource management that may be taken into account in determining when to initiate the software updates, the update manager server 114 may only initiate the software updates when a minimum amount of network bandwidth on the network 102 is available. As other examples, the software updates may only be initiated when a minimum amount of processor power or a minimum amount of RAM is free on each client computer 112, or when a maximum number of network connections are currently active on any given client computer 112.

As noted above, each client computer 112 may return information indicating the status of the update operation to the update manager server 114. The update manager server 114 may be operable to display the status information or a summary of the status information received from the client computers 112 in a graphical user interface. This may enable an administrator of the system 100 to easily see which client computers 112 have been updated with the latest version of the EDM software 160. If the update failed on any of the client computers 112, the graphical user interface may allow the administrator to re-send the update command to the client computers 112 on which the update failed. In another embodiment the update manager software 170 may be operable to automatically re-send the update command to the client computers 112 on which the update failed, or the update manager software 170 may send an email message or take other action to inform the administrator of the problem.

As described above, in some embodiments the system 100 may include heterogeneous types of client computers 112, e.g., where different client computers. 112 execute different operating systems. For example, the EDM software 160 may execute on different computing platforms within an enterprise. Each of the client computers 112 may execute update software 150 for updating the EDM software 160 on the respective client computer 112. Thus, regardless of which operating system is running on a given client computer 112, the update software 150 on the client computer 112 may respond to the update command from the update manager server 114 by connecting to the repository server 116 and downloading and installing a software update package, as described above. This may enable the EDM software 160 (or other software application) to be automatically updated in a heterogeneous enterprise environment.

It is noted that the embodiments described above are intended to be exemplary, and numerous alternative embodiments are contemplated. For example, in one alternative embodiment the functions of the update manager server 114 and the repository server 116 may be combined into a single server. For example, the software update package may be stored on the update manager server 114 instead of a separate repository server 116. As another example of an alternative embodiment, the functions of the update manager server 114 may be distributed across multiple servers. For example, one server may execute administrative software that allows an administrator to set update time criteria and view update status information, and this server may communicate with another server which actually implements the update policy and initiates the updates on the client computers 112.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for updating a software application on a plurality of client computers, the method comprising:
   a first server computer determining a time for each respective client computer of the plurality of client computers to update the software application, wherein the software application on each respective client computer is configured to perform data backup operations, wherein determining the time for each respective client computer to update the software application comprises monitoring the software application on the respective client computer to determine a time when the software application is not performing a data backup operation;
   the first server computer sending an update command to each respective client computer at the time determined for the respective client computer;
   each respective client computer communicating with a second server computer in response to the update command to determine whether an update is available for the software application on the respective client computer, wherein each one of a first subset of the client computers receives information from the second server computer indicating that an update is available, and wherein each one of a second subset of the client computers receives information from the second server computer indicating that no update is available;
   in response to receiving information from the second server computer indicating that an update is available, each respective client computer of the first subset of client computers downloading respective update information and using the respective update information to update the software application on the respective client computer;
   each respective client computer of the first subset of client computers sending status information to the first server computer indicating that the software application was updated on the respective client computer; and
   in response to receiving information from the second server computer indicating that no update is available, each respective client computer of the second subset of client computers sending status information to the first server computer indicating that no update is available for the software application on the respective client computer.

2. The method of claim 1, further comprising:
   creating a policy for updating the software application in response to user input; and
   configuring the first server computer with the policy for updating the software application;
   wherein the first server computer uses the policy in determining the time for each respective client computer to update the software application.

3. The method of claim 2,
   wherein said creating the policy comprises receiving user input specifying one or more of:
   a time window when the software application can be updated; and/or
   a maximum number of concurrent software updates.

4. The method of claim 1, further comprising:
   the first server computer monitoring resources of the client computers;
   wherein said determining the time for the each respective client computer to update the software application further comprises determining the time based on availability of resources of the respective client computer.

5. The method of claim 1,
   wherein each respective client computer of the first subset of client computers downloads the update information from the second server computer.

6. The method of claim 1,
   wherein each of the client computers receives the update command from the first server computer substantially simultaneously.

7. The method of claim 1,
   wherein the plurality of client computers include a first one or more client computers executing a first operating system and a second one or more client computers executing a second operating system.

8. A system comprising:
   a first server computer;
   a second server computer; and
   a plurality of client computers, wherein each of the client computers is configured to execute a software application, wherein the software application on each client computer is configured to perform data backup operations;
   wherein the first server computer is configured to determine a time for each respective client computer of the plurality of client computers to update the software application by monitoring the software application on the respective client computer to determine a time when the software application is not performing a data backup operation;

wherein the first server computer is configured to send an update command to each of the respective client computer at the time determined for the respective client computer;

wherein each respective client computer is configured to communicate with the second server computer in response to the update command to receive information indicating whether an update is available for the software application on the respective client computer, wherein an update is available for each one of a first subset of the client computers, and wherein no update is available for each one of a second subset of the client computers;

wherein, in response to receiving information from the second server computer indicating that an update is available, each respective client computer of the first subset of client computers is configured to download respective update information and use the respective update information to update the software application on the respective client computer;

wherein each respective client computer of the first subset of client computers is configured to send status information to the first server computer indicating that the software application was updated on the respective client computer; and wherein, in response to receiving information from the second server computer indicating that no update is available, each respective client computer of the second subset of client computers is configured to send status information to the first server computer indicating that no update is available for the software application on the respective client computer.

9. The system of claim 8, wherein the first server computer is configured to store a policy for updating the software application, wherein the policy is created in response to user input;

wherein the first server computer is further configured to use the policy in determining the time for each respective client computer to update the software application.

10. The system of claim 9, wherein the policy specifies one or more of:

a time window when the software application can be updated; and/or a maximum number of concurrent software updates.

11. A computer-accessible storage medium storing program instructions, wherein the program instructions are executable by a first server computer to cause the first server computer to determine a time for each respective client computer of a plurality of client computers to update a software application, wherein the software application on each respective client computer is configured to perform data backup operations, wherein the program instructions are executable to cause the first server computer to determine the time for each respective client computer to update the software application by monitoring the software application on the respective client computer to determine a time when the software application is not performing a data backup operation;

wherein the program instructions are executable by the first server computer to cause the first server computer to send an update command to each respective client computer at the time determined for the respective client computer;

wherein the program instructions are executable by each respective client computer to cause the respective client computer to communicate with the second server computer in response to the update command to receive information indicating whether an update is available for the software application on the respective client computer, wherein an update is available for each one of a first subset of the client computers, and wherein no update is available for each one of a second subset of the client computers;

wherein, in response to receiving information from the second server computer indicating that an update is available, the program instructions are executable by each respective client computer of the first subset of client computers to cause the respective client computer to download respective update information and use the respective update information to update the software application on the respective client computer;

wherein the program instructions are executable by each respective client computer of the first subset of client computers to cause the respective client computer to send status information to the first server computer indicating that the software application was updated on the respective client computer; and wherein, in response to receiving information from the second server computer indicating that no update is available, the program instructions are executable by each respective client computer of the second subset of client computers to cause the respective client computer to send status information to the first server computer indicating that no update is available for the software application on the respective client computer.

12. The computer-accessible storage medium of claim 11, wherein the program instructions are executable by the first server computer to cause the first server computer to store a policy for updating the software application and to use the policy in determining the time for each respective client computer to update the software application.

13. The computer-accessible storage medium of claim 12, wherein the policy specifies one or more of:

a time window when the software application can be updated; and/or a maximum number of concurrent software updates.

* * * * *